US008041026B1

(12) United States Patent
Coughlan et al.

(10) Patent No.: US 8,041,026 B1

(45) Date of Patent: Oct. 18, 2011

(54) EVENT DRIVEN NOISE CANCELLATION

(75) Inventors: Marc William Joseph Coughlan, Rozelle (AU); Alexander Quentin Forbes, Westleigh (AU); Peter D. Runcie, Bilgola Plateau (AU); Alexander Martin Scholte, Phegans Bay (AU); Ralph Warta, Lane Cove (AU)

(73) Assignee: Avaya Inc., Basking Ridge, NJ (US)

( * ) Notice: Subject to any disclaimer, the term of this patent is extended or adjusted under 35 U.S.C. 154(b) by 1294 days.

(21) Appl. No.: 11/350,180

(22) Filed: Feb. 7, 2006

(51) Int. Cl.
*H04M 1/00* (2006.01)

(52) U.S. Cl. .............. 379/392.01; 379/406.01; 381/71.1

(58) Field of Classification Search .................. 370/286; 700/94; 379/406.01, 392.01; 381/71.1
See application file for complete search history.

(56) References Cited

U.S. PATENT DOCUMENTS

| | | | | |
|---|---|---|---|---|
| 6,718,302 | B1 * | 4/2004 | Wu et al. | 704/233 |
| 6,876,966 | B1 | 4/2005 | Deng et al. | |
| 6,970,558 | B1 * | 11/2005 | Schmidt | 379/406.01 |
| 2003/0005462 | A1 * | 1/2003 | Broadus et al. | 725/110 |
| 2005/0102048 | A1 * | 5/2005 | Anderson et al. | 700/94 |
| 2005/0143988 | A1 | 6/2005 | Endo et al. | |

FOREIGN PATENT DOCUMENTS

| | | |
|---|---|---|
| EP | 1 199 708 | 4/2002 |
| EP | 1 261 962 | 12/2004 |

* cited by examiner

*Primary Examiner* — Fan Tsang
*Assistant Examiner* — Simon King
(74) *Attorney, Agent, or Firm* — Sheridan Ross P.C.

(57) ABSTRACT

Systems and methods for noise cancellation are provided. In particular, information regarding events associated with a computer providing a telephony function or associated with a hardware telephone providing a telephony function is provided to a noise cancellation process. The provided information can be used to identify specific noises associated with events, so that filters specifically adapted for removing an identified noise can be applied. Alternatively or in addition, information regarding the existence and timing of an event can be provided in order to facilitate the application of a noise cancellation filter. Noise cancellation as described can also be applied in connection with recording speech or other audio signals.

21 Claims, 4 Drawing Sheets

EVENT DRIVEN NOISE CANCELLATION

FIELD

The disclosed invention is related to detecting an event in an environment and providing the information thus obtained as an input to a noise cancellation process.

BACKGROUND

Voice telephony continues to be a primary means of communication. In order to facilitate effective voice communications, it is desirable to filter noise from the voice signal.

In order to perform noise cancellation, various noise cancellation algorithms are available. However, conventional noise processing algorithms have difficulty filtering out noises created in connection of the use of a computer, such as computer generated dings or tones, keyboard clicks, mouse clicks or output from a computer soundcard. Accordingly, conventional techniques for noise cancellation have not been particularly effective in filtering common office environment noises, such as noises generated by or associated with the operation of a computer from voice streams.

Common noise cancellation algorithms operate by estimating noise in the environment. The voice stream including noise is analyzed and the noise component is estimated and then subtracted from the outgoing voice stream. In order to improve the accuracy of such noise cancellation processes, pattern recognition may be used to estimate noise in a signal. The pattern recognition model may be trained in order to increase the amount of available pattern recognition data.

Techniques for reducing noise introduced to audio signals by computers have been proposed. For example, systems that provide a number of microphones to detect noise associated with a personal computer, in addition to a microphone external to the computer for capturing sound from the user, have been discussed. Any sound generated by the personal computer that is captured by the external microphone is subtracted from the users voice signal, by subtracting sound captured by microphones internal to the personal computer (or closely associate with the personal computer) from the signal comprising the voice information. Accordingly, such systems rely on a number of microphones.

SUMMARY

The present invention is directed to solving these and other problems and disadvantages of the prior art. In accordance with embodiments of the present invention, computer events that are associated with a noise are monitored within the computer, in order to select a noise cancellation procedure or algorithm to be applied. In particular, electronic signals within the computer are monitored to detect events that create or are associated with noise. Information identifying the event is provided to the noise cancellation algorithm, to enable the noise cancellation algorithm to select and apply the noise cancellation procedure that is most applicable to the detected event.

In accordance with embodiments of the present invention, the detection of computer events associated with the noise can be performed in connection with the use of soft telephones running on the computer on which event detection is performed. In accordance with other embodiments of the present invention, the detection of events associated with the noise can be performed in connection with a computer that is interconnected to a separate telephone or soft telephone. Furthermore, a noise cancellation process that receives input regarding detected events can be executed by the computer or computers on which monitoring of events associated with a noise is performed, on a separate computer, or on a hardware telephone.

In other embodiments of the present invention the detection of events associated with the noise can be performed in conjunction with the use of a speech recording or speech dictation system, software or device.

Additional features and advantages of the present invention will become more readily apparent from the following discussion, particularly when taken together with the accompanying drawings.

DETAILED DESCRIPTION

The present invention is generally directed to noise cancellation or reduction in communication systems. More particularly, embodiments of the present invention monitor events associated with a computer to provide a noise cancellation algorithm or process with information that can be used to improve the results obtained by a filter applied by the noise cancellation process. This information can include notification regarding the existence of an event, the timing of an event and/or can identify a noise associated with an event. The noise cancellation process can then use the provided information to determine where in a voice stream a noisy event is located, when to apply a filter, and/or the selection of a particular filter for canceling a noise associated with a detected event.

Figure 1A:
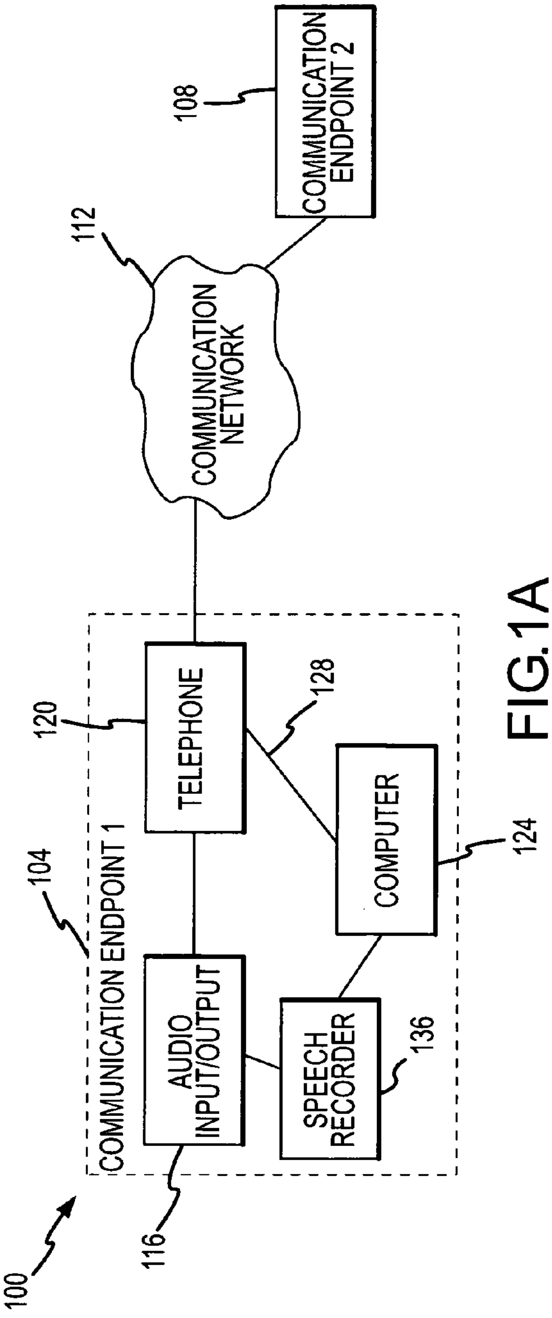
FIG. 1A is a block diagram of a communication system in accordance with embodiments of the present invention.

With reference to FIG. 1A, a communication system 100 in accordance with embodiments of the present invention is illustrated. In general, the communication system 100 includes a first communication endpoint 104 interconnected to a second communication endpoint 108 via a communication network 112.

The first communication endpoint 104 generally includes an audio input/output 116 interconnected to a telephone 120. Examples of an audio input/output 116 include a telephone handset, headset or a far talk microphone and speaker provided as part of a speakerphone function or addition to the telephone 120. The telephone 120 may comprise a conventional telephone for connection to continuous circuit networks, an Internet Protocol (IP) telephone, a telephone associated with a private branch exchange (PBX), a video telephone or any other hardware device capable of supporting voice communications. In the example communication system 100 illustrated in FIG. 1A, the telephone 120 is shown as being directly connected to the communication network 112. However, as can be appreciated in one of skill in the art, other configurations are possible. For example, the telephone 120 may be interconnected to the communication network 112 through an intermediate switch or communication server.

The first communication endpoint 104 additionally includes a computer 124. The computer 124 may comprise a general purpose computer or other electronic device. Accordingly, an example of a computer 124 is a desk top or laptop computer in the same office or cubicle as the telephone 120. The computer 124 is interconnected to the telephone 120 via a signal line 128. In general, the signal line 128 supports the exchange of information between the telephone 120 and the computer 124, and therefore supports at least one protocol that can be used by both the telephone 120 and the computer 124 to communicate with one another. Examples of such connections include Ethernet, wireless protocols such as Bluetooth, computer telephony integration (CTI), universal serial bus (USB) or other communication protocols. As will be described in greater detail elsewhere herein, information exchanged between the telephone 120 and the computer 124 depends on where various processes in accordance with embodiments with the present invention are executed. For example, where noise cancellation is executed by a noise cancellation algorithm or process running on the telephone 120, the computer 124 may provide information identifying computer events associated with noise to the telephone 120 across the signal line 128. In accordance with other embodiments, such as where a noise cancellation process is executed on the computer 124, voice information may be provided by the telephone 120 to the computer 124 across the signal line 128 for processing in the computer 124, and the computer 124 may then return a processed signal to the telephone 120 for delivery to the communication network 112. In accordance with still other embodiments, for example where the telephone 120 is interconnected to the communication network 112 through the computer 124, and where noise cancellation is performed by the computer 124, an audible signal processed by the computer 124 is passed directly to the communication network 112.

The communication network 112 may comprise a packet data network, such as a local area network (LAN) and/or a wide area network (WAN). Alternatively or in addition, the communication network 112 may comprise a dedicated connection between two or more communication endpoints 104, 108. In accordance with still other embodiments of the present invention, the communication network 112 may comprise a continuous circuit based communication network, such as the public switched telephony network (PSTN) or a wireless network. Furthermore, the communication network 112 may include a number of different network types in various configurations.

The second communication endpoint 108 may comprise any type of communication endpoint capable of supporting voice communications. Accordingly, the second communication endpoint 108 may be configured like the first communication endpoint 104 in order to provide enhanced noise cancellation features. Alternatively, the second communication endpoint 108 may be a conventional telephony device. In accordance with still other embodiments of the present invention, the second communication endpoint 108 may comprise a recording device. Exemplary recording devices include voice mail systems, or systems adapted for storing audible information for later listening and/or distribution.

Figure 1B:
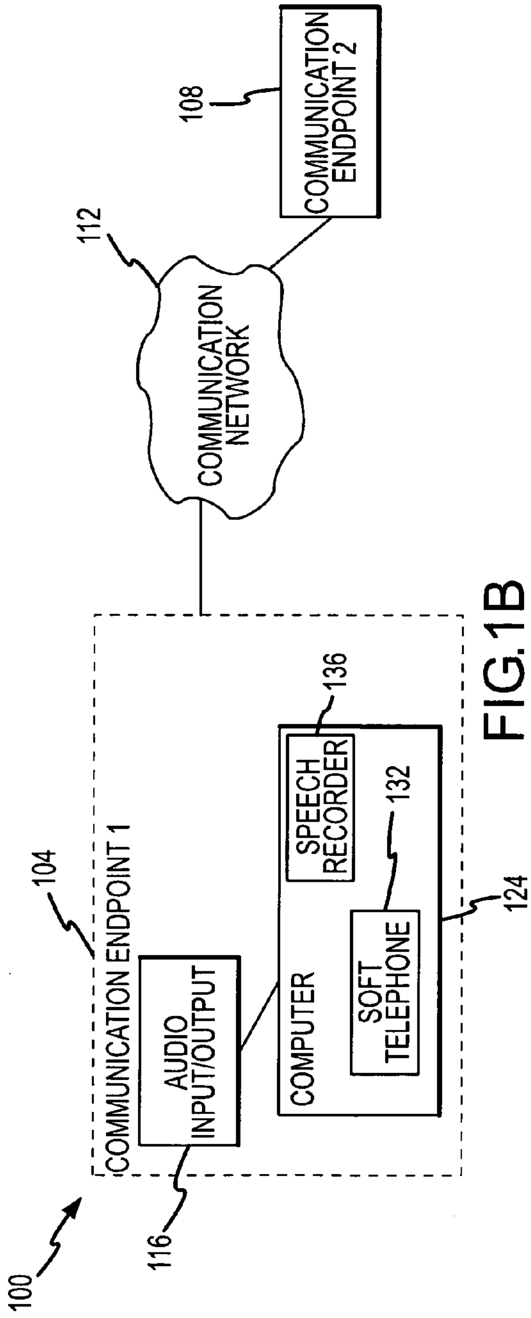
FIG. 1B is a block diagram of a communication system in accordance with other embodiments of the present invention.

With reference to FIG. 1B, a system 100 in accordance with other embodiments of the present invention is illustrated. In general, the communication system 100 illustrated in FIG. 1B is similar to the communication system 100 illustrated in FIG. 1A. For example, the communication network 112 and/or the second communication endpoint 108 may be the same as or similar to corresponding components provided as part of the communication system 100 illustrated in FIG. 1A. However, the first communication endpoint 104 is different. In particular, the communication endpoint 104 in FIG. 1B features a soft telephone 132 implemented by or in connection with a computer 124 interconnected to an audio input/output 116. Therefore, such embodiments do not include a hardware telephone that is separate from a computer 124. Accordingly, the computer 124 in such embodiments maybe connected to the communication network directly. Alternatively, the computer 124 may be interconnected to the communication network 112 through a switch or communication server.

In accordance with still other embodiments of the present invention, as illustrated in FIGS. 1A and 1B, a communication endpoint 104 may be associated with a speech recorder 136, such as a dictation device. If provided, a speech recorder 136 may be in addition to a telephone 120 or a soft telephone 132, or may be an alternative audio device to a telephone 120 or a soft telephone 132. In addition, a speech recorder 136 can be interconnected to the computer 124 (FIG. 1A) or implemented by the computer 124 (FIG. 1B).

Figure 2A:
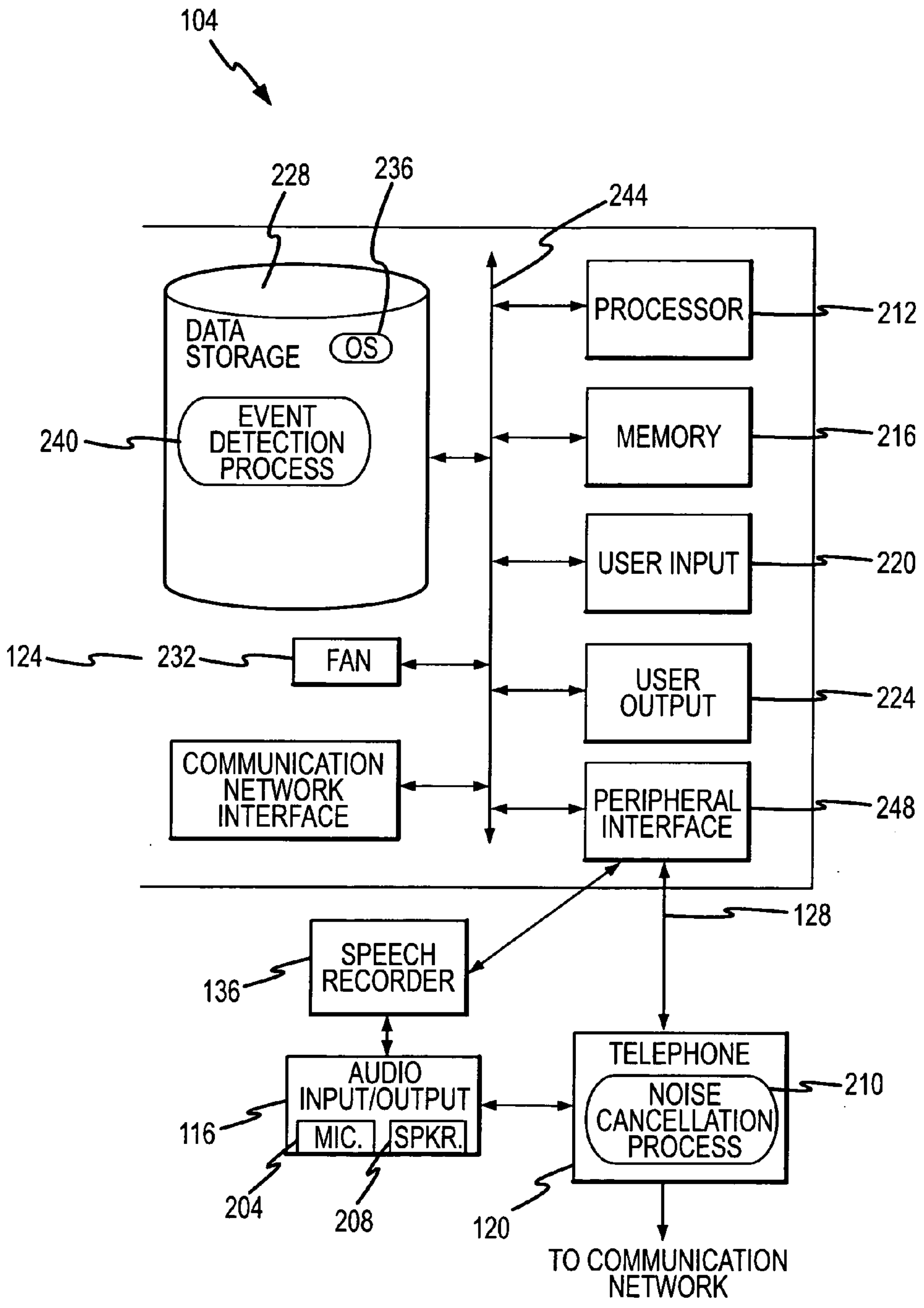
FIG. 2A is a block diagram depicting components of a communication endpoint in accordance with embodiments of the present invention.

With reference to FIG. 2A, a communication endpoint 104 in accordance with embodiments of the present invention incorporating a hardware telephone (e.g. as illustrated in FIG. 1A) is shown in greater detail. The audio input/output 116 generally includes a microphone 204 for receiving voice information from a user. As can be appreciated by one of skill in the art, the microphone 204 will also receive noise from the ambient environment, including noise associated with computer 124 events. The audio input/output 116 also generally includes a speaker 208 for providing voice information from other communication endpoints or other audio sources to the user. The audio input/output 116 is interconnected to the telephone 120, for example as a handset provided as part of the telephone 120 or a headset interconnected to the telephone 120. Furthermore, the audio input/output 116 may be provided as part of the telephone 120, for example as a microphone and a speaker 208 integral to the body of a telephone 120 providing a native speakerphone functionality. If the communication endpoint 104 includes a speech recorder 136, it may receive an audio input from the audio input/output, and may be in communication with the computer 124.

The telephone 120 generally comprises a hardware telephone. For example, the telephone 120 may comprise an IP or switched circuit telephone interconnected to a communication network, 112, either directly or through one or more intermediate devices. In addition, the telephone 120 may include a processor for executing a noise cancellation process 210. The telephone 120 may also include memory for storing instructions executed by the processor in connection with operation of the noise cancellation process 210.

The speech recorder 136 may include any device for recording an audio signal, such as a dictation device. Furthermore, the speech recorder 136 may use analog or digital storage, such as memory 216 or data storage 228, or some other data storage to store recorded speech or other audio signals. The speech recorder 136 may also include a processor and/or hardwired logic to perform functions of the speech recorder 136, which may include execution of a noise cancellation process 210. In addition, although embodiments of the present invention may include a speech recorded 136 that is primarily used to record a user's speech, it should be appreciated that other embodiments of the present invention are not so limited. For example, a speech recorder 136 can be used to record any sound in an environment.

The computer 124 may include a processor 212 capable of executing program instructions. Accordingly, the processor 212 may include any general purpose programmable processor or controller for executing application programming.

Alternatively, the processor 212 may comprise a specially configured application specific integrated circuit (ASIC). The processor 212 generally functions to run programming code implementing various other functions performed by the computer 124 and the communication endpoint 104. The computer 124 may additionally include memory 216 for use in execution of the programming by the processor 212 and for the temporary or long term storage of data or program instructions. Memory 216 may comprise solid state memory resident, removable or remote in nature, such as DRAM or SDRAM. Where the processor 212 comprises a controller, the memory 216 may be integral to the processor 212.

In addition, various user input devices 220 and user output devices 224 may be provided. Examples of input devices of 220 include a keyboard, a numeric keypad, and a pointing device combined with a screen or other position encoder. As can be appreciated by one of skill in the art, the operation of user input devices 220 by a user can result in or be associated with a noise. For instance, operation of a keyboard or a mouse typically results in a clicking sound. In addition, as a result of user input provided through a user input device 220, sounds may be generated by a user output device 224. Examples of user output devices 224 include a sound card in combination with a speaker, or a tone generator. Other examples of user output devices 224 include peripheral devices, such as a printer. As can also be appreciated by one of skill in the art, operation of such user output devices 224 can be associated with a noise. These noises can be objectionable, particularly when they are picked up by a microphone 204 during voice communication with a second communication endpoint 108. Other sources of noise in or associated with the computer 124 include the operation of associated components such as data storage devices 228 comprising hard disk drives, floppy disc drives, tape drives, optical drives, or other storage devices having moving components, a cooling fan 232, or any other device interconnected to or included in a computer 124 that is associated with a noise that is related to a computer event.

The data storage 228 generally provides for the storage of application program and/or data. For example, operating system software 236 may be stored in the data storage 228. Examples of applications that may be stored in the data storage 228 include an application comprising an event detection process 240. The event detection process 240 generally functions to detect events within the computer 124, in order to report the occurrence of such events to the telephone 120 to facilitate the cancellation of the noise associated with detected events by the noise cancellation process 210. For example, the event detection process 240 may monitor signals on one or more internal buses 244 provided as part of the computer 124 to detect events (i.e. particular signals associated with events) that are or may be associated with a noise. Information associated with or identifying events detected by the event detection process may be provided to the noise cancellation process 210 running on the telephone 120 via a peripheral interface 248 and signal line 128 interconnecting the telephone 122 and the computer 124.

Figure 2B:
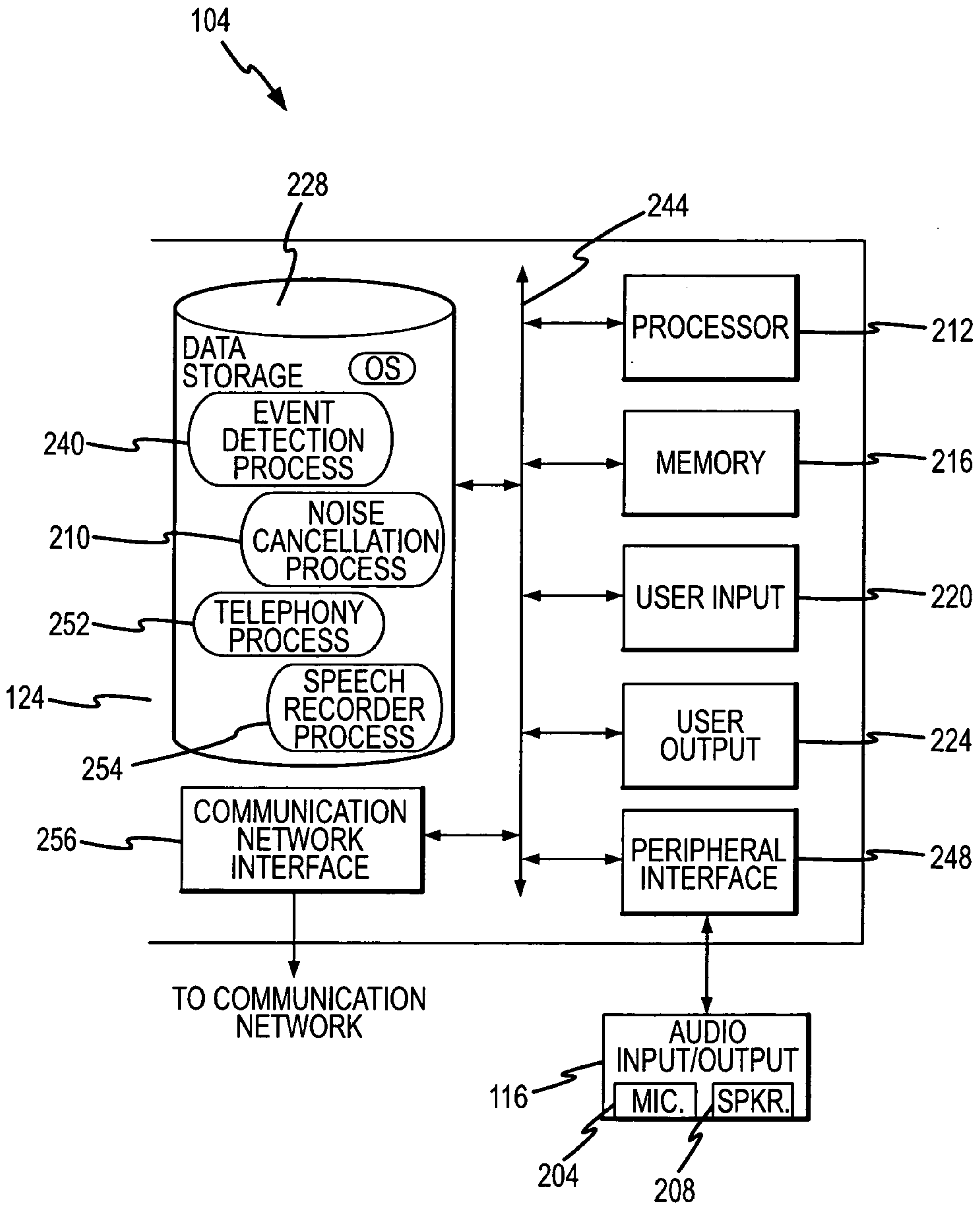
FIG. 2B is a block diagram depicting components of a communication endpoint in accordance with other embodiments of the present invention.

With reference to FIG. 2B, a first communication endpoint 104 in accordance with other embodiments of the present invention (e.g. as illustrated in FIG. 1B) is depicted. In general, such embodiments do not include a telephone that is separate from the computer 124. Instead, such embodiments generally include application software comprising a telephony process 252 that may be stored in the data storage 228 and executed by the processor 212 of the computer 124. In addition, the noise cancellation process or algorithm 210 may also comprise an application stored in the data storage 228 and executed by the processor 212 of the computer 124. The event detection process 240 may also be stored in the data storage 228 and executed by the processor 212 of the computer 124. A speech recorder process 254 for implementing a speech recorder 136 function may also be stored in the data storage 228 and executed by the processor 212 of the computer 124. The computer 124 is also interconnected to an audio input/output 116 through a peripheral interface 248 that provides a microphone 204 and speaker 208 to support voice communications by a user. As can be appreciated by one of skill in the art, the microphone 204 and speaker 208 may be provided as part of an audio input/output 116 comprising a handset or speakerphone module. As also can be appreciated by one of skill in the art, the microphone 204 and speaker 208 may be separately provided. For instance, the microphone 204 may comprise a far talk microphone and the speaker 208 may comprise one or more speakers, interconnected to a sound card provided as part of an audio output system of the computer 124. According to embodiments of a first communication endpoint 104 such as illustrated in FIG. 2B, the event detection process 240 running on the computer 124 provides notification of detected events to the noise cancellation process 210 also running on the computer 124. Furthermore, the noise cancellation process 210 may perform a noise cancellation before releasing an audio stream to the telephony process 252 for transmission to a second communication endpoint 108 via a communication network interface 256 interconnected to the communication network 112.

Although particular arrangements within a first communication endpoint 104 are illustrated in FIGS. 2A and 2B, other arrangements are possible. For example, a noise cancellation process 210 running on the computer 124 may be used in connection with a hardware telephone 120 that provides the voice information to the computer 124 for processing on that computer 124. In accordance with other embodiments of the present invention, a telephone 120 interconnected to the internal bus 244 of the computer 124 may store and execute the event detection process 240. Similarly, a speech recorder 124 may store and execute the event detection process.

Figure 3:
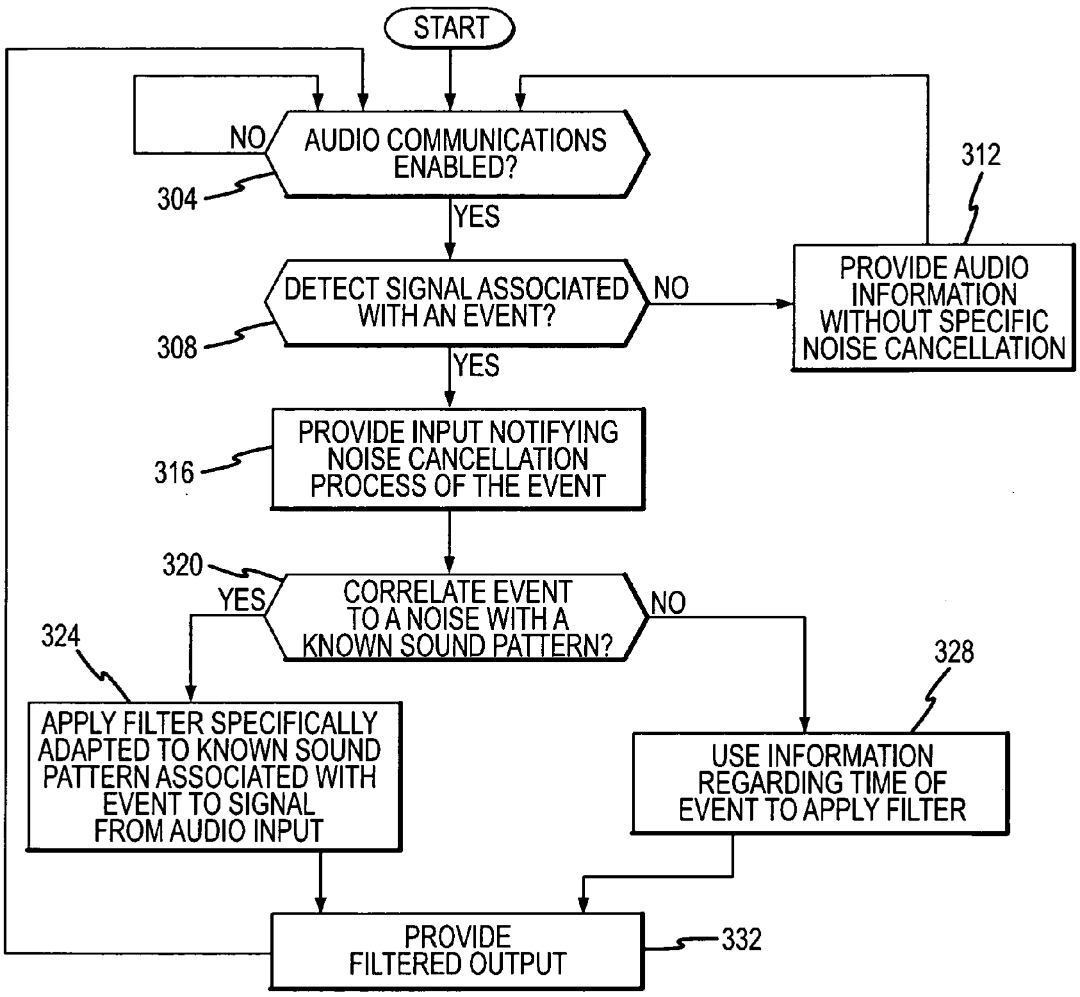
FIG. 3 is a flow chart depicting aspects of the operation of a communication endpoint in accordance with embodiments of the present invention.

With reference now to FIG. 3, aspects of the operation of embodiments of the present invention are illustrated. Although the description related to FIG. 3 is related to telephony applications in which voice audio signals are transmitted between a number of communication endpoints 104, 108 it should be appreciated that the described process and alternative embodiments thereof is also applicable to recording audio signals. Initially, after starting the system, a determination is made as to whether audio communications have been enabled (step 304). If audio communications have not been enabled (e.g. a telephone call has not been placed) the process may idle at step 304. After determining that audio communications have been enabled, a determination may be made as to whether a signal associated with an event on the computer 124 has been detected (step 308). If a signal associated with an event is not detected, audio information is provided for transmission to a second communication endpoint 108, without applying noise cancellation specifically targeted to a detected event (step 312). The process may then return to step 304 to determine whether audio communications remain enabled.

If a signal associated with an event is detected at step 308, an input notifying the noise cancellation process 210 of the event is provided by the event detection process 240 (step 316). In general, a signal associated with an event may comprise a signal on an internal bus 244 of the computer 124. Furthermore, the event detection process 240 need not monitor all data transported by an internal bus 244. For instance, an event detection process 240 may monitor signals associated with specific peripheral devices, such as user input devices 220 or peripheral user output devices 244, the operation of which are associated with the generation of noise. Furthermore, the input notifying the noise cancellation process 210 of the event may comprise an identification of the event, the time at which the event occurred, and/or a specific identification of the detected event.

At step 320, a determination is made as to whether the detected event is correlated to a noise having a known sound pattern. In accordance with embodiments of the present invention, the determination as to whether a detected event can be correlated to a noise with a known sound pattern is performed by the noise cancellation process 210 in response to information identifying the event provided by the event detection process 240. Alternatively, correlation of an event to a noise with a known sound pattern can be performed as part of the event detection process 240, and provided to the noise cancellation process 210 as part of the notification of the event.

If the detected event is correlated with a known sound pattern, the noise cancellation process 210 applies a filter specifically adapted to the known sound pattern associated with the detected event to the audio signal received from the microphone 204 of the audio input/output 116 (step 324). That is, based on the identification of the sound associated with the detected event, the noise cancellation process 210 can select a filter specifically adapted for filtering out the associated noise. As can be appreciated by one of skill in the art, the filter applied in connection with the cancellation of the specifically identified noise can comprise applying an inverse representation of that noise to the audio input signal in order to subtract that noise from the audio input signal. Furthermore, the information identifying the detected event can include the time at which the event occurred, to facilitate locating the noise associated with the detected event in the stream of audio data.

If no correlation between the detected event and a noise having a known sound pattern is made at step 320, information can be provided regarding the time of the event to assist the noise cancellation process 210 in canceling noise associated with the event from the desired audio information. For example, the noise cancellation process 210 may apply a noise cancellation filter to the received audio stream over a period of time encompassing the event or the time at which the noise associated with the event is expected to occur. The noise cancellation filter applied at step 328 may be a general noise cancellation filter, or a filter generally adapted to common computer 124 related events.

After applying a specifically selected filter at step 324, or using information regarding the occurrence of an event to control the time at which a filter is applied at step 328, the filtered output is provided for transmission to the second communication endpoint 108 via the communication network 112 (step 332). The process may then return to Step 304, to determine whether audio communications remain enabled. Accordingly, the process of event detection and noise cancellation may continue for as long as a user is engaged in a call or is otherwise providing audio information in connection with which noise cancellation is desired.

As can be appreciated as one in skill of the art from the description provided herein, embodiments of the present invention allow for noise associated with the operation of a computer 124 at or included in a communication endpoint 104 to be removed or cancelled from voice or other desired audio information collected by a microphone 204 associated with that communication endpoint 104. In particular, by monitoring signals corresponding to events on a computer 124, a noise cancellation process 210 can be provided with timing and/or information identifying the detected event, in order to apply specific or targeted noise cancellation measures.

Accordingly, embodiments of the present invention permit more effective noise cancellation as compared to noise cancellation systems that apply noise filters without discrimination as to the time and/or identity of events associated with the noise. In addition, by detecting electrical signals associated with events in order to determine whether there is a noise in the environment of a communication endpoint 104, the reliability of detection is improved. Furthermore, embodiments of the present invention can be provided by the addition of software applications to existing telephones 120, speech recorders 136 and/or computers 124, without requiring modifications to hardware. In particular, embodiments of the present invention do not require the provision of separate microphones in order to detect noise.

Although embodiments of the present invention have been discussed in connection with voice telephony between two endpoints or in connection with speech recording, it should be appreciated that the present invention is not so limited. For instance, embodiments of the present invention may be applied in connection with the recording of any type of audio information input at or from a location where one or more computers 124 are operated. Furthermore, embodiments of the present invention are not limited to detecting the noise of a single computer 124 in connection with a communication. For example, information regarding events may be collected from a number of computers 124 at a location of a communication endpoint 104.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include alternative embodiments to the extent permitted by the prior art.

What is claimed is:

1. A method for canceling noise, comprising:

monitoring an internal bus in a computing device for a signal associated with an event;

detecting on the internal bus of the computing device a first signal associated with a first event, wherein the first signal is not an audio signal;

correlating said first event to an associated noise, wherein the first signal associated with the first event is not a representation of the noise associated with the first event;

providing an input identifying the noise correlated with said first event to a noise cancellation process, wherein the input does not include the detected first signal;

in response to said input, selecting a noise cancellation procedure; and implementing said selected noise cancellation procedure by applying the selected noise cancellation procedure to an audio input signal that includes noise and voice information received by a microphone, wherein the audio input signal received by the microphone does not include an audible representation of the detected first signal.

2. The method of claim 1, wherein said selected noise cancellation procedure comprises subtracting said identified noise from a received audible signal, wherein said identified noise that is subtracted is not a copy or a modified version of the first signal, wherein voice information is included in the received audible signal.

3. The method of claim 1, wherein said input includes a time at which said first signal was detected, wherein said implementing said selected noise cancellation procedure includes time aligning a filter to a stream of received audio information, wherein selected filter is applied to a portion of said received audio information corresponding to the time at which said first signal was detected.

4. The method of claim 1, wherein said implementing said selected noise cancellation procedure includes at least one of filtering an unknown pattern from the voice information and filtering a known noise pattern associated with the event.

5. The method of claim 1, further comprising:

converting said received noise and voice information to an electrical audible input signal, wherein said implementing a selected noise cancellation procedure is performed with respect to said electrical audible input signal.

6. The method of claim 5, wherein said electrical audible input signal is received from the microphone, and wherein the microphone is provided as part of a telephone handset.

7. The method of claim 6, wherein said telephone handset is provided as part of a telephone in communication with said computing device.

8. The method of claim 7, wherein said selected noise cancellation procedure is implemented by said computing device.

9. The method of claim 7, wherein said selected noise cancellation procedure is implemented by said telephone.

10. The method of claim 1, wherein the first signal is not provided by a microphone.

11. The method of claim 1, wherein the first signal is generated by an activity associated with a noise, and wherein the first signal does not cause a noise to be generated.

12. The method of claim 1, wherein the detected signal is associated with an event that is related to controlling operation of a peripheral device, wherein operation of the peripheral device is correlated to a noise comprising known sound pattern, and wherein the peripheral device is selected from the group consisting of a keyboard, a numeric keypad, a printer, a hard disk drive, a floppy disk drive, a tape drive, an optical drive, and a cooling fan.

13. A communication endpoint, comprising:

a computer;

a microphone;

a bus;

an event detection process, wherein signals associated with events generated in connection with at least one of control or operation of the computer are detected on the bus, wherein said events are associated with noise, and wherein the signals do not comprise audio signals that are themselves representative of the noise;

a noise cancellation process, wherein information identifying events detected by the event detection process is used to select a noise cancellation procedure applied to a signal generated in response to audible information received by said microphone, wherein said signals detected by the event detection process are not included in the audible information received by the microphone.

14. The communication system of claim 13, wherein said event detection process and said noise cancellation process are executed by said computer.

15. The communication system of claim 13, further comprising:

a soft telephone application, wherein said soft telephone application is executed by said computer.

16. The system of claim 13, further comprising a telephone interconnected to said computer and a signal line interconnecting said telephone of said computer, wherein said noise cancellation process is running on said telephone, and wherein information identifying events detected by the event detection process is provided to said noise cancellation process over said signal line.

17. The system of claim 16, wherein said telephone comprises an Internet Protocol telephone.

18. The system of claim 13, further comprising an interconnection to a communication network, wherein said audible information received by said microphone is provided to said communication network after application of said selected noise cancellation procedure to said audible information received by said microphone.

19. A communication system, comprising:

means for general purpose computing;

means for detecting events including events associated with a noise running on said means for general purpose computing, wherein said events are detected as event signals, wherein said event signals are not audio signals, and wherein said event signals do not include information collected by a microphone;

means for receiving audible information from a user and noise from a surrounding environment;

means for supporting telephony communications;

means for selecting a noise cancellation procedure in response to information received from said means for detecting events;

means for applying said selected noise cancellation procedure to audible information received from said means for receiving audible information.

20. The system of claim 19, wherein said means for detecting events, said means for selecting a noise cancellation procedure, said means for applying said selected noise cancellation procedure, and said means for supporting telephony communications comprise applications executed by said means for general purpose computing.

21. The system of claim 19, wherein said means for supporting telephony communications includes a processor for executing application instructions, wherein said means for applying said selected noise cancellation procedure is executed by said means for supporting telephony communications.

* * * * *